Sept. 25, 1962 G. L. ANDERSON 3,055,743
GAS DETECTION APPARATUS
Filed July 6, 1959 3 Sheets-Sheet 1
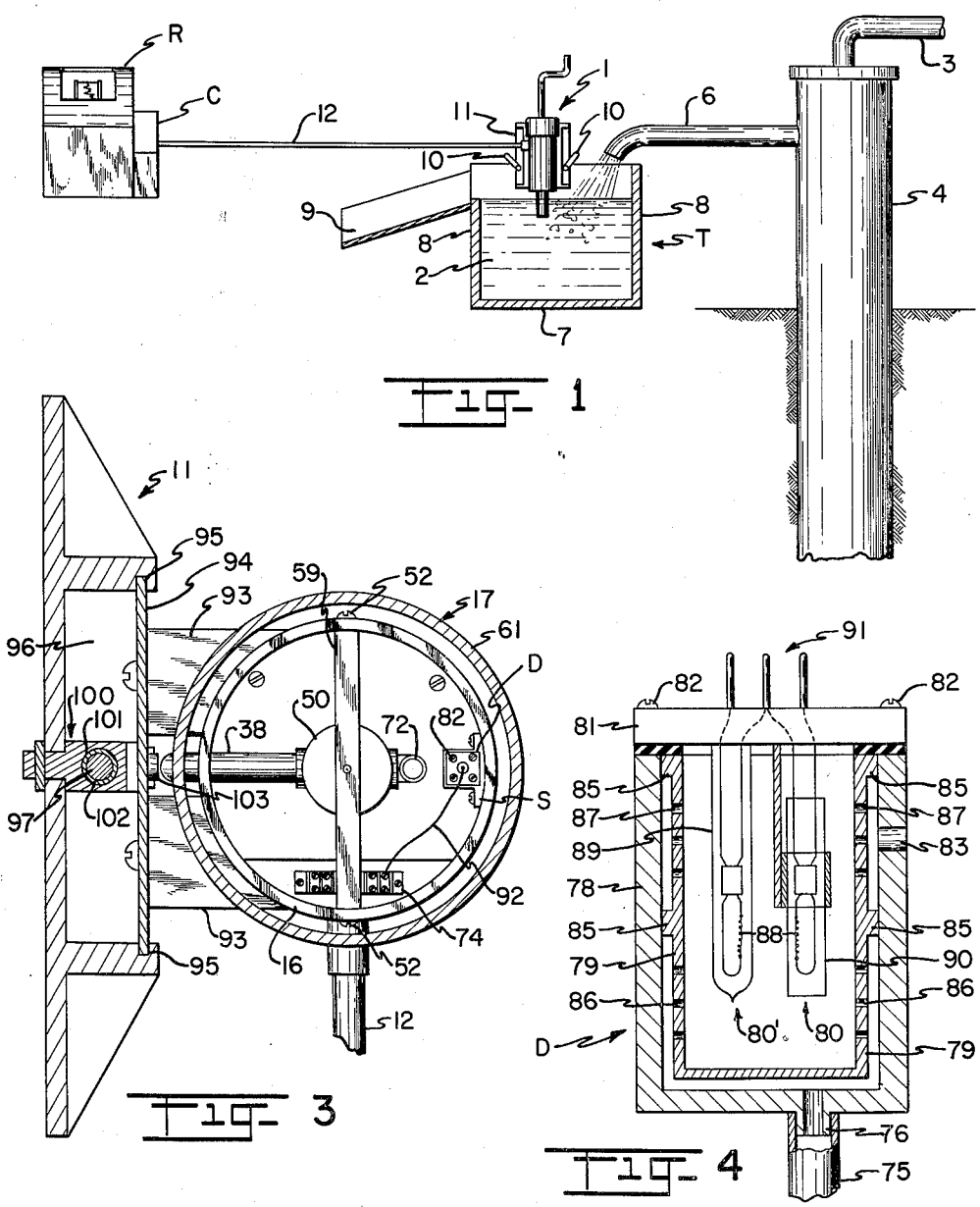
INVENTOR.
GEORGE L. ANDERSON
BY
Philip H. Sheridan
ATTORNEY

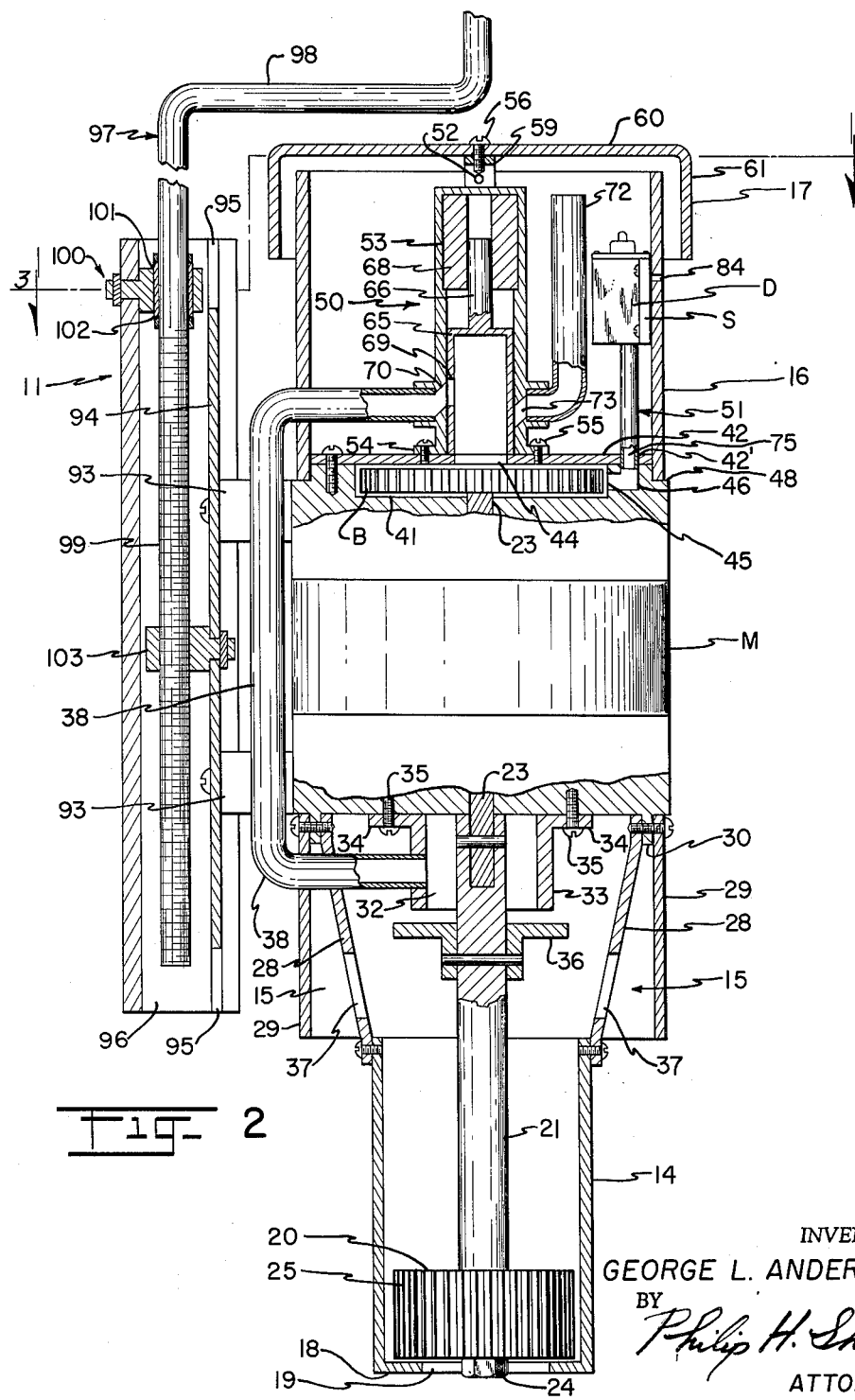

INVENTOR.
GEORGE L. ANDERSON
ATTORNEY

United States Patent Office 3,055,743
Patented Sept. 25, 1962

3,055,743
GAS DETECTION APPARATUS
George L. Anderson, Calgary, Alberta, Canada, assignor to Eastman Oil Well Survey Company, Denver, Colo., a corporation of Delaware
Filed July 6, 1959, Ser. No. 825,009
16 Claims. (Cl. 23—253)

The present invention relates to an improved apparatus and system for detecting the presence of gas and is more particularly related to a system for the extraction and measurement of the gas content in drilling fluids employed in the drilling of oil or gas wells.

In the well drilling art it is common practice to circulate a drilling fluid, commonly termed "drilling mud," through the well and up again to the surface where it is discharged into a basin or trap. The mud, such as a suspension of clay or similar material together with other suitable materials for controlling the properties of the mud, will operate in flowing through the well to entrain a portion of the gases from subsurface formations being traversed by the drill bit and to carry these gases into the mud trap.

The ability to rapidly and reliably detect the presence of these entrained gases can of course be very important in properly indicating the character of the subsurface formations as they are being traversed. The entrained gases may be separated from the mud in the basin or trap by well known means. For example, the mud may be heated, or agitated, in order to release the gases for detection. Once separated, it is then essential that the gases be accumulated and metered through a suitable chamber provided for detection purposes with minimum time delay between separation and detection and with minimum dilution of the gases prior to detection. In this way it is then possible to obtain accurate gas readings and to correlate the gas readings with recorded depth and rate of penetration so as to rapidly pinpoint production zones and to determine whether certain formations are possible producers.

Previously, to the best of my knowledge, it has been found difficult to prevent undue dilution of the gases and, at the same time, accomplish the rapid and accurate detection of the gases at or adjacent to the point of extraction. As an example, complicated and space consuming equipment including an extensive network of piping, valves and regulators have been employed to conduct the gases to the point of detection, and to prepare the gases extracted for detection. The gases are thus conducted some distance away from the point of extraction prior to detection, causing additional dilution due to the amount of entrapped air in the pipe and other equipment, and further causing a lag time in obtaining gas readings at the point of detection. Moreover, systems including long series of piping are influenced by weather conditions, particularly low temperatures which may cause partial stoppage of the gas flowing in the system on account of freezing of the condensed mixture from the gases. Furthermore, the above mentioned deterents to effective detection and others have in turn required still additional equipment and parts in order to properly prepare the gases for accurate detection.

It is accordingly a primary object of the present invention to obviate the foregoing disadvantages and many others and to provide for a method and improved apparatus capable of effecting in a unique manner the rapid and accurate detection of gases entrained in a fluid at the point of extraction.

It is another object to provide for a compact, unitary apparatus incorporating means to establish the rapid and efficient extraction and flow of gases normally entrained in a well drilling fluid for detection, and to selectively control the flow of gases for detection and the flow of air and the like for cleaning purposes, the above being carried out in close proximity to the drilling fluid.

It is a further object to provide for a unitary apparatus for the detection of gases adjacent the point of extraction from well drilling fluids, which may be selectively adjusted in accordance with the height of the fluids, and conformable for operation under extremes in weather conditions with minimum dilution and time delay and in such a way as to provide for the more rapid and complete separation of the gases from the drilling fluid for detection.

It is also an object to provide for a way of increasing the flow of air into the trap for mixing with the gas in the drilling fluid so that the gas will become more readily separated from the drilling fluid for detection purposes.

It is a further object to provide means to induce the flow of air into intimate contact with the gas entrained fluid for mixing with the gases so as to permit more complete separation of a greater percentage of the gas at an increased rate, together with means disposed for the efficient withdrawal of the drilling fluid without interfering with the inward flow of air for mixture with the gases.

It is a still further object to provide for a unitary gas detection apparatus occupying a minimum amount of space, which may be easily adjusted and disposed for either the continuous or intermittent detection of the gas at the point of extraction from a mud trap in such a way as to materially reduce dilution of the gas, and to accurately correlate gas readings with the depth of penetration in drilling.

It is still an additional object of the present invention to provide for a gas detection apparatus forming a single package installation which is greatly simplified and reliable in operation, requires minimum control and maintenance, is of rugged construction and operable under all types of weather conditions.

The above and other objects and advantages will become more apparent from a consideration of the following detailed description taken together with the drawings wherein a preferred embodiment is illustrated and wherein:

FIGURE 1 is a schematic diagram showing a typical mode of attachment and disposition of a gas detection apparatus, in accordance with the present invention, in relation to a conventional well drilling and recording installation;

FIGURE 2 is an enlarged side view partially in section of the preferred form of gas detection apparatus of FIGURE 1;

FIGURE 3 is a top section view taken about lines 3—3 of FIGURE 2;

FIGURE 4 is an enlarged detailed section view of a reaction chamber including a detector unit, suitable for use in the apparatus of the present invention;

Figure 5:
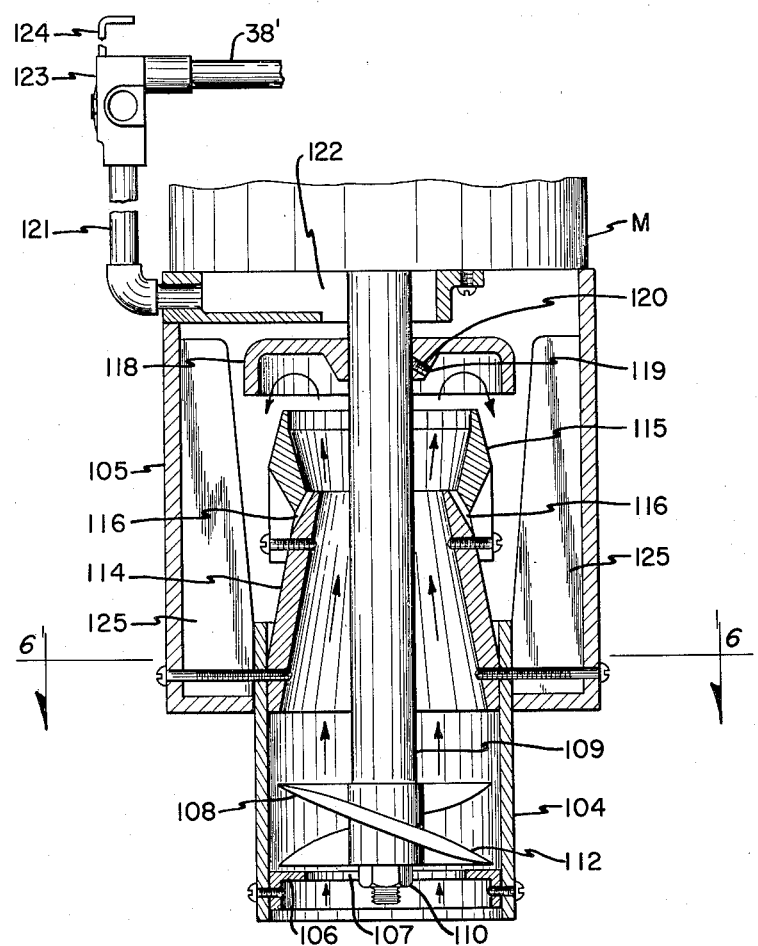
FIGURE 5 is an elevational view partially in section of a modified form of gas detection apparatus in accordance with the present invention.

With more particular reference to the drawings, there is illustrated in FIGURE 1 a typical application of a preferred form of gas detection apparatus 1, shown suspended from the side of a mud box or basin T for extension into a well drilling fluid 2. The fluid 2 represents that fluid which has been circulated through a drill pipe 3 through the drilling bit (not shown) and returned through a casing string 4 to the surface where it and the material carried thereby are discharged by suitable means through a pipe or conduit 6 for collection in the mud basin or trough T. The basin T may be formed of a bottom panel 7 and side wall members 8 extending vertically above the ground level together with a shale shaker 9 and, of course, in the usual manner the fluid and sediment is conducted to and away from the body T.

As will become apparent hereinafter, the essence of this invention resides in the unit 1 and the construction and use thereof. Thus the other elements of FIGURE 1 have been shown schematically as they are known and by themselves form no part of this invention. In this latter connection, reference is made to United States Patents Nos. 2,341,169, 2,514,690, 2,704,658 and 2,792,072.

The unit 1 may either be permanently or removably attached to one side 8 of the box. However, to illustrate its conformability for use with various structures, it is shown removably attached by means of suitable C-shaped clamps 10 which may be adjusted in a well known manner to hold a bracket or stationary support member 11 of the unit tightly against the side 8. In addition, there is shown leading into the unit 1 a power supply cable connecting line 12 from a suitable recording apparatus R preferably located at a station remote from the unit 1. For a complete explanation and illustration of a suitable type of recording apparatus, reference is made to copending U.S. applications Serial Nos. 462,833 and 687,051, filed October 18, 1954, now Patent No. 2,860,509, and September 30, 1957, now Patent No. 3,005,525, respectively, and owned by the assignee of this invention. Briefly, the recording apparatus R is provided with a cabinet C having, among other things well known in the art, a number of switches and indicators to control the operation of the unit 1 through the cable line 12.

In general appearance, the gas detection unit 1 in its preferred form is made up of a number of interconnected, generally cylindrical sections which are relatively light weight and compactly arranged as shown in FIGURE 2. In ascending order, these cylindrical sections are comprised broadly of a mud inlet section 14, a mud outlet 15, a heavy walled motor casing M and a valve and detector housing 16. A dome cover 17 is also shown attached in spaced, outer concentric relation over the top of the valve and detector housing 16. In a manner to be described hereinafter in more detail, the entire light weight unit may be vertically adjusted in relation to the height of the fluid 2 for extension of the mud inlet section 14 into the fluid, as in FIGURE 1, for extraction of the entrained gases.

For extracting the gases, the mud inlet 14 is provided with an annular bottom plate 18 having a central opening 19 to permit influx of the mud or fluid 2 into the interior of the section 14. To agitate, beat and circulate the mud as it enters the inlet section 14 an impeller 20 is centered for downward extension through the mud inlet section on a mounting shaft 21. To drive the impeller, an electric motor (not shown) is mounted in the motor casing M having a vertically extending drive shaft 23 coupled to the end of the mounting shaft 21. The impeller 20 is held onto the lower extremity of the shaft 21 by means of a nut 24. As represented at 25, the impeller 20, which is of a standard and well known type, is made up of a plurality of radially extending blades disposed at an angle to the horizontal so as to direct the fluid upwardly, and the blades are equally spaced about a central rotor, not shown, journaled to the shaft 21. Preferably, the blades are composed of a tough, rubbery material, such as neoprene, which will not be affected by the cuttings and chemical action of the fluid 2. Of course, various types of impellers 20 may be utilized.

As the fluid is agitated and forced in an upward direction by the impeller, some initial separation of the gases from the high density fluids will occur. To induce further the withdrawal and upward flow of the gases through the mud inlet a blower or fan unit B is provided, to be described later in more detail, although such also is of the well known type and may assume various forms. The gases may thus be drawn by the blower unit B into the mud outlet section 15 which includes an interior conical wall 28 diverging upwardly from the mud inlet wall, and an exterior skirt 29 which along with the wall 28 are attached at their upper ends to a common flange 30 of the motor casing M. An accumulation chamber 32 is spaced concentrically between the impeller shaft 21 and the conical wall 28 which consists of a cylindrical wall 33 open at its lower end and an exterior shoulder 34 for fastening the wall 33 to the motor casing M by means of screws 35. A horizontal deflection plate 36 carried on the impeller shaft 21 is spaced below the lower open end or mouth of the accumulator chamber 32.

Thus, as the gases are drawn upwardly toward the open end of the chamber 32, the plate 36 will separate any remaining circulating fluid or mud and deflect the fluid through ports 37, which may be any number spaced circumferentially around the conical wall 28, and into the annular space between the wall 28 and skirt 29 to the outside of unit 1 and to trough T. From the accumulation chamber 32 the blower B draws and pulls the gases through a gas line or conduit 38 forming a passage communicating with the chamber 32. As shown, the conduit 38 extends horizontally from the chamber 32 to the exterior of the unit, then vertically upwards to a point above the motor casing M where it is returned through the valve and detector housing section 16 into the interior of the unit. The blower system B, preferably a pressure type, is disposed below the outlet end of the conduit where it is housed in a recess portion 41 formed in the top of the motor casing M. The pressure type blower B is held in position with its top surface substantially flush with the top of the motor casing formed by a plate 42 bolted or otherwise suitably secured to the motor casing M. The blower B is also provided with a central inlet, not shown, in alignment with a central opening 44 disposed in the plate 42, and an exhaust port, also not shown, extending through the outer rim of the blower B for communication through port 45 with an elbow-shaped bore portion 46 in the motor casing M. The motor drive shaft 23 extends upwardly through the center of the blower 40 to actually support the latter and carries the usual parts for effecting rotation of the blades of the blower B. In this manner the motor may thus be arranged to provide synchronous rotation of the blower B and the impeller 20 on a common vertical axis so as to establish controlled and selective withdrawal of the gases in accordance with the rate of extraction by the impeller.

An additional feature of the present invention is the construction and arrangement of ports in the valve and detector housing 16 including a valve unit 50 interposed between the gas line 38 and the blower B which may be energized by remote control to selectively control the passage of gas or air through the blower where either may be expelled out of the exhaust port 45 into a flow control section 51 prior to entrance into a reaction or detection chamber D. For this purpose the valve and detector housing 16 are positioned over the motor casing with the lower end of the cylindrical wall 16 fitting tightly over the upper end of the casing M against the vertical and horizontal surfaces of a ledge 48. The housing is further held in position by the plate 42 which may be welded at its outer edge to the inner surface of the wall 16 just above the lower end thereof.

The valve assembly 50 is located above the blower inlet and includes an outer elongate, cylindrical valve chamber 53 provided at its lower, open end with a peripheral flange 54 which is secured to the plate 42 by screws 55, and an upper, closed end having a centering nut 56 spaced from the upper end of assembly 50. The mounting bar 59 lies diametrically across the upper, open end of the housing 16 and is attached to the inner surface of the housing by screws 52 (see FIGURE 3). The dome cover 17, including a top portion 60 and a downwardly extending skirt 61, may then be located over the housing 16 and secured to the mounting bar 59 by suitable means 56 so that the top 60 and the skirt 61 are disposed in outer spaced relation over the housing 16 and will permit the entry of fresh air into the housing, yet protect it from direct exposure to the weather.

The valve proper comprises a two position valve which may either be manually or electrically responsive to move to a first position to establish communication between the gas line 38 and blower B and to move to a second position to establish communication between the exterior of the housing 16 through the upper end thereof and the blower B so as to provide for the flow of fresh air therethrough. This is accomplished preferably by the use of a hollow, inner concentric plunger 65 controlled for axial movement through the lower end of the chamber 53 by means of a solenoid control including an armature 66 surrounded by an electromagnetic coil 68 mounted in the upper end of the valve chamber. As shown in FIGURE 2, in a lower normally biased first position an opening 69 is disposed in alignment with an upwardly directed opening 70 defining a gas intake port, in the wall of the chamber 53 leading from the outlet end of the gas line 38. At the same time, the plunger will block the flow of air through a fresh air stack 72 which is fastened to the assembly 50 to surround an inwardly and downwardly directed fresh air intake port 73. In the second position the armature 66 may then be urged upwardly through the energized coil 68 until the upper end of the plunger abuts against the bottom of the coil 68 and with the lower end of the plunger moving past the downwardly directed fresh air port 73, but blocking the gas intake opening 70. To insure that the valve 50 will be in the correct position for normal detection operations, it is preferred to use a spring-loaded switch (not shown) which may be located on the cabinet C and electrically connected into the solenoid through the cable supply line 12. In this connection, and as shown in FIGURE 3, the cable supply line 12 is led into a terminal strip 74 from which point individual connections may be made into the various components, including the motor, the solenoid valve and the detector unit D, all in a well known manner.

In order to meter the flow capacity of gas or air between the exhaust port 45 and the reaction chamber D, the flow control section 51 is formed preferably of a metering tube having orifice 75 and is inserted at its lower end through air opening 42' in the plate 42 into alignment with the bore 46, and section 51 is secured at its opposite end to a nipple 76 defining the inlet port into the reaction chamber D. In this way the flow of gas may simply and efficiently be controlled by first reducing the cross section, if desired, throughout the bore 46 and forcing the fluid to change directions before flowing into the orifice 75 and nipple 76 which may each be given successively reduced cross sections to thereby establish a steady, uniform flow of the gases into the reaction chamber. The detector device may be of any suitable type, although the reaction chamber D has been found particularly desirable and broadly comprises an outer heavy walled enclosure 78 secured to the inner side of the housing 16 by any suitable support means S, a comparatively thin walled liner 79 spaced concentrically within the enclosure 78, a detector filament 80 and compensator filament 80' suspended within the liner 79 from a top plate 81 as shown in FIGURE 4. The top plate 81 forms the cover portion for the entire detector assembly and is secured along its rim to the top edge of the enclosure 78 by screws 82.

It will be noted that the enclosure 78 includes the nipple 76 extending into the orifice 75 to receive the gases or air flowing therethrough and a bore portion 83 defining an outlet port for conducting the gases away from the chamber through an opening 84 in the housing 16 to the exterior. The liner 79, which forms a flashback arrestor for the detector device, is attached to the outer enclosure 78 by circumferentially extending ribs 85 at the top and immediate portion thereof so as to center the liner within the enclosure. Spaced in the wall of the liner are a plurality of inlet apertures 86 disposed below the intermediate rib which serves to divide and uniformly disperse the gases for flow across the detector and compensator filaments, and outlet apertures 87 spaced between the ribs 85 to conduct the gases out of the liner through the outlet port 83.

The compensator and detector filaments 80' and 80 consist of two essentially similar platinum filament wires 88 suspended within a pair of elements in the form of glass tubes, a tube 89 being sealed in air at atmospheric pressure to wholly enclose the compensator filament wire, and a tube 90 being open at each end for disposition in spaced relation over the detector filament wire to allow the flow of gas thereacross. In this way the filaments may be heated by passing a current through electrical connections 91, which are taken from the filaments through an extension cord 92 into the terminal strip 74 (see FIGURE 3). The differential change in resistance as a result of burning the combustible gases adjacent to the detector filament 80 may then be measured by the use of a Wheatstone bridge circuit (well known in the art) wherein the detector filament 80 defines a leg of variable resistance and the compensator filament 80' a leg of fixed resistance. The other side of the bridge, together with a recording meter (not shown), may be located in the recording apparatus and as the gas content of the mixture surrounding the detector filament will cause a change in resistance, this change may be measured and recorded by the recording apparatus.

Due to the light weight and compactness of the entire apparatus, it is possible to make the unit portable and conformable for use on various types and sizes of mud traps, and in a unique manner. A prime objective in providing portability and conformability for use at different installations is to make the entire apparatus vertically adjustable so as to permit raising and lowering the entire assembly, particularly the mud inlet section 14 and enclosed impeller 20 in accordance with the height of the drilling fluid. An additional advantage in providing easy and rapid raising and lowering is to enable disposition of the mud inlet section at the proper depth within the fluid for most efficient agitation of the fluid as the fluid varies in height throughout the drilling operation. To this end, the unit 1 may be adjustably secured to the bracket 11 by interconnection of two arms 93 between the upper and lower side of the motor casing M and a mounting plate 94 which is slidable in opposed vertical slots 95. The slots are disposed, on the inside walls of a U-shaped guide portion 96 forming a vertical recessed portion on the bracket 11. In order to control the sliding movement of the mounting plate 94 along with the entire unit 1, a crank 97 is provided including a handle 98 and an elongate rod 99 extending downwardly between the mounting plate 95 and bracket 11, the rod 99 being threaded throughout the lower portion thereof opposite the mounting plate 94. The crank 97 is centered in position by a bracket hanger 100 including an opening 101 having a bushing 102 or the like therein to embrace the smooth upper portion of the rod so as to permit rotational movement of the rod and at the same time holding it against vertical movement, and a plate hangar 103 forming a threaded sleeve secured to the plate 94 to receive the threaded portion of the rod 99 and impart vertical movement to the mounting plate 94 and the attached unit 1 as the threaded rod is rotated by the handle 98.

A more complete understanding of the utility and novelty of the apparatus, particularly unit 1, may be gained from a consideration of a complete cycle of operation. The impeller 20 is immersed in the drilling mud collected in the basin T first by attaching the bracket 11 in the desired position against one side 8 of the basin with the clamps 10, then further adjusting the apparatus to the desired elevation by rotation of the crank 97. The cable connector line 12 may then be connected into the terminal strip 74 providing the necessary electrical power connections into the motor, the solenoid valve 50 and the filaments 80 and 80' as described.

Prior to actual detection, the filaments 80 and 80' comprising one side of the bridge circuit are properly calibrated and balanced for zero readings by passing fresh air into the reaction chamber D so as to provide a neutral atmosphere for adjustment. This may be accomplished by energizing the solenoid valve through the spring loaded switch to move the valve plunger 65 upward blocking the flow of gas through the gas intake port 70 and allowing fresh air to be drawn through the stack 72 and blower B into the reaction chamber D. In addition to the solenoid valve switch, the recording apparatus houses a filament voltage adjustment and voltage lower lever (not shown) for tests such as methane, to calibrate the recording meter in order to zero the filaments on air, all in accordance with methods well known to the art.

Upon release, the spring loaded switch will return to the first position for detection of the gases. The plunger will then move downward to block the flow of fresh air and to cause any gas extracted to flow through the opening 69 into the blower B for expulsion through the flow control section 51 and into the reaction chamber D. It will be evident that the temperature of the detector filament 80 will vary in accordance with the amount of gas forced into the chamber D and available for combustion purposes, and the resistance of the filament 80 may therefore increase as a function of the amount of heat or combustible mixture present. This increase, as is well known in the art, will accordingly cause a current flow across the recording meter which in turn may be suitably amplified for recording on a gas reading chart at the recording apparatus.

The extraction rate of flow of gas into the reaction chamber D from the accumulation chamber 32 will of course be dependent upon the volume of gas present, the efficiency of extraction in the mud inlet 14, and the selected size of the metering tube 51. In this connection the relative disposition and arrangement of the blower and impeller has been found to serve as a particularly efficient way for extraction of the gases. They may be operated synchronously in a single enclosed unit through a short distance therebetween, yet permit complete separation at the mouth of the accumulation chamber 32 and exhaust ports 37. Thus, with a short distance of travel, very little dilution of the gases occurs, the gas chamber and lines are protected to a great extent from exposure to the weather and accordingly it is possible to eliminate gas treatment equipment which could unduly complicate the apparatus. On account of the efficient and predictable manner in which the gases are extracted, metering of the gas flow into the reaction chamber D may be simply controlled merely by controlling the bore size of the tube 75 and the nipple 76. As mentioned, the gradual reduction in diameter and arrangement of the passages from the blower B into the reaction chamber D will enable uniform, low turbulent flow of the gas at the desired rate into the chamber. As an alternative, the tube 75 may be tapered toward the nipple to establish the desired flow control and in any event the bore size of the tube and other elements can be suitably varied in accordance with the quantity of gas. If desirable, of course, other suitable rate controlling means may be provided and would be entirely within the scope of the present invention.

Following each period of detection, the solenoid valve may again be energized to the second position to flush out any gases remaining in the reaction chamber by means of the flow of fresh air therethrough so as to prepare the chamber for the next detection operation. Thus, the apparatus may be operated either continuously or intermittently for whatever periods desired. It is to be noted also that the unique disposition and arrangement of the solenoid valve will permit rapid flushing whenever desired and by the control of a single switch. Of course, the impeller will continue to operate during this interval, although the gases will not be drawn into the accumulation chamber 32 except by their natural tendency to rise. Therefore, undue pressure buildup cannot occur, yet extraction will be continuously carried on to make gases immediately available for detection when the valve automatically returns to its first position. If, for any reason, it may be necessary or desirable to stop the extraction operation while the detection unit is being flushed or calibrated, the impeller may quickly be withdrawn from the fluid by turning the crank handle 98 to raise the impeller 29 out of the fluid.

Figure 6:
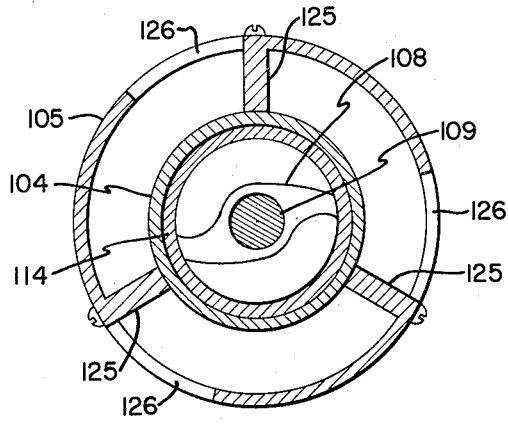
FIGURE 6 is a sectional view taken on lines 6—6 of FIGURE 5.

There is shown in FIGURES 5 and 6 a modified form of the present invention wherein inlet section 104 and mud outlet section 105 are substantially varied in construction and arrangement to provide for the more complete and efficient separation of the gases from the drilling fluid as they are induced to flow upwardly into the gas detection trap of the apparatus. In order to withdraw the drilling fluid upwardly through the gas detection trap, the mud inlet 104 is provided with an annular bottom plate or end ring 106 having a central opening 107 to permit entry of the mud or fluid into the interior of the section 104. To induce the upward flow of gas entrained fluid through the mud inlet section, an impeller 108 is centered for disposition at the lower end of the mud inlet section on motor drive shaft 109 which in turn is driven by an electrical motor, not shown, mounted in a motor casing M having as before a vertically extending drive shaft coupled to the end of the mounting shaft 109. The impeller 108, which may be held in position at the lower end of the drive shaft 109 such as by means of a suitable nut 110, is provided with a helical blade 112, the blades 112 being disposed at such an angle as to impart a lifting or upward force to the fluid as the fluid strikes the blades in passing into the mud intake. This angle may be, for example, between 30 to 40 degrees, although it will be apparent that the angle of the impeller is not critical and further does not form an essential part of the present invention. In addition, the impeller may be of a tough rugged material such as metal and of sufficient strength so as not to be affected by the cuttings in the drilling fluid passing into the mud intake.

Forming the upper end of the mud inlet section 104 is a frusto-conical injector tube 114 which extends upwardly and inwardly in such a fashion as to form a gradually reduced area in the mud inlet section 104. Mounted at the top surface of the injector tube 114 is a venturi ring 115 which inclines gradually upwardly and outwardly from the top surface of the injector tube 114 so as to form therewith a venturi passage which in accordance with well known principles will be effective to increase the velocity of the drilling fluid flowing therethrough while reducing the pressure accordingly. In addition, at the junction between the top surface of the injector tube 114 and the bottom surface of injector ring 115 there are provided in circumferentially spaced relation a plurality of downwardly directed openings 116 forming air intakes for the injection of air into the mud from the exterior of the gas detection apparatus. Of course the air will be induced to flow into the venturi passage through the intake openings 116 on account of the reduced pressure caused at the restricted opening adjacent the top surface of the injector tube, and due to the turbulence and increased rate of flow of the drilling fluid at this point the air will be caused to mix intimately with the fluid and to combine with the gas molecules entrained within the fluid.

To cause initial separation of the gas-air mixture, a horizontally disposed deflector plate 118 is shown mounted on the drive shaft 109 in upper spaced relation to the top surface of the injector ring 115. The deflector plate is given an inverted, generally dish-shaped, configuration with a central opening for disposition on the drive shaft and may be held in place by a screw 119 threaded through bore 120 to engage the drive shaft. It will thus be apparent, as indicated by arrows in FIGURE 5, that as the gas entrained fluid is forced upwardly through the venturi passage and strikes the undersurface of the deflector plate, the mixture will be forced to change its course of direction and return downwardly and outwardly past the exterior surface of the injector ring 115. At the same time a blower unit, such as the type shown in FIGURE 1, may be disposed above the motor casing M and together with gas conductor tube 121 and accumulation chamber 122 will operate to induce the upward flow of the gas-air mixture therethrough while the higher density mud continues its downward flow through the mud outlet section 105. The accumulation chamber 122 may be suitably secured to the bottom of the motor casing M in spaced relation to the drive shaft 109 so as to form an enclosed annular space to receive the gas-air mixture. The gas conductor tube 121 extends horizontally from communication with the accumulation chamber 122 to the exterior of the unit, then vertically upward to a point above the motor casing where it is connected into a flushing valve 123. The valve 123 includes a handle 124, and from the valve 123 a pipe 38' is extended horizontally therefrom into the interior of the unit for communication with the blower unit and solenoid valve.

An additional feature of the modified form of invention is the construction of the mud outlet or discharge section 105 to include a generally cylindrical wall and an annular closure plate extending from the bottom edge of the wall horizontally into contact with the mud inlet, and the mud outlet may be secured by bolts or other suitable means to the mud inlet, as shown. In addition, radial, inwardly directed deflector blades 125 are circumferentially spaced around the interior of the cylindrical skirt forming the mud discharge wall, together with mud discharge openings 126, there being an opening 126 provided adjacent to and just in front of each of the deflector blades 125. A corresponding number of air intake ports, not shown, may be disposed on the opposite side of each of the deflector blades from the mud discharge openings and at a point on the wall of the mud discharge section preferably just opposite the air intake openings leading into the venturi passage. In a manner to be described, the deflector blades 124 will thus be effective to control the exit of the mud being diverted by the deflector plate and prevent the mud and drilling fluid from interfering with the entry of air through the mud discharge section into the air intake openings 116.

In order to effectively withdraw the gas entrained fluid from the basin or trap T, the mud inlet section 104 may be lowered to the desired depth into the drilling fluid as indicated in FIGURE 1 with the detector housing being adjustably supported by means of a clamp 10 and support member 11 against the side 8 of the trap. The mud or gas entrained fluid may then be drawn up into the mud intake section by means of the impeller 108 rotating on the motor drive shaft 109. The end ring 106 is disposed to prevent any backwash from the impeller due to centrifugal forces and will also prevent the jamming of rock cuttings between the leading outer edge of the impeller blades and the surrounding pipe forming the inlet section. As the mud is forced upwardly through the injector tube 114 its velocity will of course gradually increase with the corresponding pressure drop, which will become greatest at the restricted upper end of the injector tube, followed by expansion of the fluid into the venturi ring 115, thus causing a vacuum tending to draw air into the venturi ring through the intake openings 116. The aerated mud may then be diverted outwardly and downwardly by the deflector plate 118 and the combined rotation and configuration of the deflector plate will initiate the breaking up of the gas-air mixture from the mud at this point. From the deflector plate the mud will be forced or directed downwardly against the three stationary deflector blades 125 extending inwardly from the discharge section, the latter also aiding in the separation of the gas-air mixture from the mud. The final separation of the gas-air mixture will ocur when the mud drops to the bottom of the housing upon striking the deflector blades, at which point its direction of travel will again be reversed in order to escape out of the discharge openings 126. As the gas-air mixture is separated from the drilling fluid at various stages, the blower unit will operate to encourage the upward movement of the gas-air mixture into the chamber 122 and through the gas conductor tube upwardly into the detector housing section.

The deflector blades 125, in breaking up the movement of the mud as it is directed outwardly from the deflector plate, will also create an open air column on the down stream edge of the blades and thereby provide an air entry space for the movement of fresh air through the intake openings in the venturi, and further will provide a space for the gas-air mixture to be drawn past the deflector plate into the gas collector ring or chamber 122. The flushing valve 123 is provided at the upper end of the gas conductor tube so that the entry to the blower may be blocked off and air drawn from the atmosphere to the accumulation chamber 122. A water or steam hose may then be inserted into the opening of the valve so as to wash any accumulated mud or foreign matter back down the gas conductor tube through the accumulation chamber into the mud inlet housing. This may be done periodically to assure free passage of the gas to the blower unit.

The modified form of invention as described has particular application where it is necessary to provide for the efficient removal of large quantities of gas from a large volume of mud passing through the tray at a relatively high velocity. Through the use of helically arranged blades on the impeller, for example, the mud flow through the trap may be very great. Nevertheless, by providing for the entry of air into intimate contact with the gas entrained fluid it has been found that the resultant gas-air mixture will separate from the mud more readily than the minute particles of gas alone, thereby permitting the removal of a large percentage of gas from the mud. Also, the deflector blades cooperate to aid in the separation of the gas-air mixture while permitting the air to move inwardly at a rapid rate through the discharge section and through the intake openings without interference from the outwardly directed drilling mud passing through the discharge section. Furthermore, in the provision for more efficient removal of gas from an increased volume of drilling fluid a more representative example of the mud system circulating in the well may be obtained and all this is necessary when encountering zones that have low pressure, low permeability, or are quite thin. Under these conditions the gas content in the mud will be very low since most of the first gas readings from a zone come from a portion that is drilled up by the bit. In addition the increased efficiency by aerating the mud assures the extraction of a good gas sample from the large mud volume handled and the increased velocity of the mud will incidentally keep the internal parts washed free of any caking of the mud thereon.

Individually and together, the parts comprising the unitary gas detection apparatus of the present invention eliminate many other elements normally considered necessary for efficient gas recovery and detection, enable simplified and much more reliable detection at the location of extraction, and may be operated by remote controls either continuously or intermittently and automatically, yet are light weight and compact to permit portability and adjustability in accordance with the height of the drilling fluid in the trap.

While there has been described and illustrated a preferred embodiment of the present invention, it will be apparent to those skilled in the art that many changes and variations may be made in the present apparatus without departing from the spirit and scope of the invention as set forth in the appended claims.

What is claimed is:

1. A gas detection apparatus comprising an impeller for extension into a gas entrained fluid, a blower member, means for driving said impeller and said blower member, means disposed adjacent said impeller for selectively admitting gases released from the fluid including a conduit communicating with said blower, a detection chamber including means for measuring the gases flowing into said chamber, a metering tube for controlling the rate of flow of the gas into said chamber, and valve means disposed in said conduit and including an inlet communicating with the exterior of said housing for the admission of fresh air into said valve, said valve being operative for selectively and alternately controlling the passage of gas through said blower and said detection chamber followed by the passage of air therethrough for the purpose of removing condensed moisture and gases to thereby obtain a neutral atmosphere in said detection chamber.

2. A gas detection apparatus comprising a housing, an impeller for extension into a gas entrained fluid, a blower member, means for synchronously driving said impeller and said blower members, passage means disposed adjacent said impeller for selectively admitting gases released from the fluid and a conduit communicating with said blower, a detection chamber including means responsive to gases flowing into said chamber to detect the gas content, a metering tube interconnecting said blower and said detection chamber for controlling the rate of flow of the gas into said chamber, and electrically responsive valve means disposed in said conduit and including an inlet communicating with the exterior of said housing for the admission of fresh air into said valve, said valve being operative for selectively and alternately controlling the passage of gas through said blower and said detection chamber and the passage of air therethrough for the purpose of removing condensed moisture and obtaining a neutral atmosphere in said detection chamber.

3. A unitary gas detection apparatus comprising a housing, an impeller for extension into a gas entrained fluid, a blower member, a motor for synchronously driving said impeller and said blower members, an accumulation chamber including a deflector plate disposed adjacent said impeller for selectively admitting gases released from the fluid and a conduit communicating with said blower, a detection chamber including means responsive to gases flowing into said detection chamber to indicate the content thereof, rate control means interconnecting said blower and said detection chamber to establish a uniform rate of flow of the gas into said chamber, and a multiposition valve member disposed in said conduit and having an inlet communicating with a source of fresh air, said valve being electrically responsive for successively controlling the passage of gas then air through said blower and into said detection chamber, the flow of air being for the purpose of removing condensed moisture and gases in said detection chamber.

4. A unitary gas detection apparatus comprising a housing for adjustable suspension above a well drilling fluid including an inlet at one end and an enclosed vent at its opposite end, an impeller for extension into the fluid for the extraction of gases therefrom, a blower member, a motor providing a common drive shaft for driving said impeller and said blower members, passage means communicating with said inlet for admitting gases released from the fluid including a conduit member, a reaction chamber including a filament responsive to gases flowing into said chamber to indicate the gas flow, and a metering orifice to control the rate of flow of the gas into said reaction chamber, and a valve member including an inlet communicating with said vent portion for the admission of fresh air into said valve, said valve being operative for selectively and alternately controlling the passage of gas and air through said blower and said reaction chamber.

5. In a gas detection apparatus including means for extracting the gases to be detected, a conduit member to receive the gases upon extraction, and a detection device, the combination therewith comprising, an outside source of air, blower means communicating with said conduit and said detection device for drawing the gases through said conduit upon extraction and forcing them through said detection device, a valve member interposed between said conduit and blower means being movable to a first position communicating with said conduit to allow the flow of gas between said conduit and said blower means and to a second position establishing communication between the outside source of air and said blower means while interrupting communication with said conduit so as to provide for the flow of air through said detection device while blocking the flow of gas through said conduit, and means connected to said valve member for selectively energizing said valve to move to either of said positions.

6. In a gas detection apparatus including means for separating and accumulating the gases to be detected having a conduit member for the flow of the gases from said means and a detection device, the combination therewith comprising, an outside source of air, blower means interconnecting said conduit and said device for drawing the gases from said separating and accumulating means and forcing them through said device, and a valve member having a chamber provided with a gas intake and an air intake portion interposed between said conduit and blower means and a plunger for movement through said chamber to a first position opening said gas intake and establishing communication between said conduit and said blower means for the flow of gas therethrough and to a second position opening said air intake to establish communication between the outside source of air and said blower means for the flow of air through said device while blocking the flow of gas through said gas intake, and means connected to said plunger for selectively and successively moving said plunger to each of said positions.

7. In a gas detection apparatus including means for separating and accumulating the gases to be detected, a conduit member for conducting the gases from said means, and a detector device including means to control the rate of gas flow through said deflector, the combination therewith comprising blower means disposed for operation between said conduit and said detector device for drawing the gases from said separating and accumulating means and forcing them through said detector, and a valve member having an outer chamber open at one end adjacent said blower and including an upwardly directed gas intake and downwardly directed air intake on opposed sides of said chamber adjacent the open end and inner concentric plunger open at one end corresponding with the open end of said chamber and provided with an opening in the side thereof, said plunger being proportioned to move to a first position to establish communication between said gas intake and said blower means for the flow of gas therethrough and to a second position to establish communication through said air intake between the exterior of said apparatus and said blower means to provide for the flow of fresh air through said detector while blocking the flow of gas through said conduit, and means associated with said plunger for normally biasing said plunger in the first position and to selectively move said plunger to the second position, the flow of air through said detector being for the purpose of obtaining a neutral atmosphere therein.

8. In a gas detection apparatus according to claim 7 wherein said means associated with said plunger comprises a solenoid disposed in the upper end of said chamber and a spring loaded switch member electrically connected to said solenoid to selectively energize said solenoid to move said plunger to each of said positions.

9. A portable unitary gas detection assembly comprising a plurality of generally cylindrical housing sections arranged in vertical, connected relation having a mud inlet section enclosing an impeller for the extraction of gases from a well drilling fluid being collected in a basin, a mud outlet section enclosing an accumulator chamber for selectively receiving gases extracted by said impeller; a motor casing enclosing a blower unit and a motor including a drive shaft for synchronously driving said impeller and said blower on a common vertical axis, a valve and detector section enclosing a valve member communicating with the inlet side of said blower and a detection unit including a flow control line communicating with the outlet side of said blower, and a cover spaced above said valve and detector section to admit air into the interior of said section, a gas line interconnecting said accumulation chamber and said valve, means associated with said valve to selectively control the passage of gas or air through said valve and into said blower, and adjustable securing means secured to the exterior of at least one of said housing sections for suspension of said assembly from the side of the basin over the fluid, said securing means including means for raising and lowering said assembly, in attached position, in accordance with the height of the drilling fluid.

10. A unitary gas detection assembly comprising a mud inlet section verging upwardly into a venturi shaped passage, a motor drive shaft extending vertically through said mud inlet section having an impeller disposed at the lower end thereof for the extraction of gases from a well drilling fluid and a deflector plate mounted in spaced relationship above said passage, a mud outlet section disposed in outer concentric relation with respect to said passage and said mud inlet section including mud discharge openings spaced circumferentially around said outlet section adjacent to the lower end thereof, together with radial deflecting means extending inwardly from said mud discharge section to control the discharge of mud through said discharge openings, a motor casing enclosing a blower unit and a motor including drive means for synchronously driving said motor drive shaft and said blower on a common vertical axis, a valve and detector section enclosing a valve member communicating with the inlet side of said blower and a detection unit including a flow control line communicating with the outlet side of said blower, a cover spaced above said valve and detector section to admit air into the interior of said section, gas collecting and conducting means interconnecting said mud inlet section above said deflector plate and said valve with means associated with said valve to selectively control the passage of gas or air through said valve and into said blower, and adjustable securing means on the exterior of at least one of said housing sections for extension of said assembly from the side of the basin over the fluid, said securing means including means for raising and lowering said assembly, in attached position, in accordance with the height of the drilling fluid.

11. A unitary gas detection assembly according to claim 10 wherein said passage is provided with air intake openings communicating with said passage adjacent the location of reduced pressure to provide for drawing air into the mud inlet section for mixing with the gas to thereby encourage the separation of gas from the fluid.

12. A unitary gas detection assembly according to claim 11 wherein said collecting and conducting means includes an accumulation chamber disposed on the bottom of said motor casing in spaced relation above said deflector plate to receive the gas-air mixture separated from the drilling fluid for conduction to said blower unit.

13. In a gas detection apparatus having an impeller disposed on a drive shaft for extension into a gas entrained fluid for driving fluid upwardly through a mud inlet section together with deflecting means spaced above the mud inlet section for directing the fluid outwardly through openings in an outer mud discharge section, the combination of means in the mud inlet section to reduce the pressure of the fluid flowing upwardly therethrough, and an air intake adjacent said means to reduce the pressure to provide for drawing air into the mud inlet section for mixing with the gas thereby encouraging the separation of gas from the fluid.

14. In a gas detection apparatus having an impeller disposed on a drive shaft for extension into a gas entrained fluid for driving fluid upwardly through a mud inlet section together with diverting means on said drive shaft for directing the fluid outwardly through an outer concentric mud discharge section, the combination of a venturi in the mud inlet section to reduce the pressure of the fluid flowing upwardly therethrough, an air intake communicating with the interior of said venturi adjacent the location of reduced pressure to provide for drawing air into said venturi for mixing with the gas thereby encouraging the separation of gas from the fluid, and stationary deflectors in the mud discharge section to control the direction of discharge of the fluid being diverted outwardly from the mud inlet section.

15. In a gas detection apparatus having an impeller disposed on a drive shaft for extension into a gas entrained fluid for driving fluid upwardly through a mud inlet section together with diverting means spaced on said drive shaft for directing the fluid outwardly through an outer mud discharge section, the combination of a venturi defining an upper continuation of the mud inlet section to reduce the pressure of the fluid flowing upwardly therethrough, air intake ports communicating with said venturi adjacent the location of reduced pressure to draw air into said venturi for mixing with the gas thereby encouraging the separation of gas from the fluid, and radially disposed deflectors in the mud discharge section to establish the entry of air through said air intake ports past the fluid being diverted outwardly and further to provide for the movement of the separated gas-air mixture upwardly past the diverting means for detection in said apparatus.

16. In a gas detection apparatus having an impeller disposed on a drive shaft for extension into a gas entrained fluid for driving fluid upwardly through a mud inlet section mounted in inner concentric relation within a mud discharge section, the combination of a venturi in the mud inlet section to reduce the pressure of the fluid flowing upwardly therethrough, air intake ports adjacent said venturi in the mud inlet section to draw air into the mud inlet section for mixing with the gas thereby encouraging the separation of gas from the fluid, an inverted, dish-shaped deflector plate mounted for rotation on the drive shaft in spaced disposition above said venturi, and stationary, radially disposed deflectors positioned adjacent to discharge openings in the mud discharge section to control the discharge of fluid being diverted outwardly and to provide for the movement of the separated gas-air mixture upwardly past the diverting means for detection in said apparatus.

References Cited in the file of this patent

UNITED STATES PATENTS

| | | |
|---|---|---|
| 2,023,731 | Johnson et al. | Dec. 10, 1935 |
| 2,393,092 | Doan | Jan. 15, 1946 |
| 2,704,658 | Gordon | Mar. 22, 1955 |
| 2,748,884 | Erwin | June 5, 1956 |
| 2,792,072 | Moore | May 14, 1957 |
| 2,801,905 | Bonner | Aug. 6, 1957 |
| 2,857,251 | Krogh | Oct. 21, 1958 |
| 2,871,105 | Moore | Jan. 27, 1959 |